UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GALLOCYANIN DYE.

961,362.  Specification of Letters Patent.  Patented June 14, 1910.

No Drawing.  Application filed February 19, 1910.  Serial No. 544,870.

*To all whom it may concern:*

Be it known that I, WILHELM LOMMEL, doctor of philosophy, chemist, citizen of the German Empire, residing at Elberfeld, Germany, have invented new and useful Improvements in Gallocyanin Dyes, of which the following is a specification.

In United States Letters Patent 856537 a dyestuff of the oxazin series is described which is chemically decarboxylated gallocyanin derived from nitrosodimethylanilin and gallic acid. The gallocyanin derived from nitrosodiethylanilin and gallic acid is not particularly described and my experience is that by the process hitherto known for the production of these compounds it cannot be obtained in technical yields. I have found a process for its production which consists in using for the condensation salts of the nitroso compound of diethylanilin with such acids as form with the nitroso compound difficultly soluble salts.

I have now found that a new coloring matter of the oxazin series is produced from gallocyanin (obtained by the action of nitrosodiethylanilin on gallic acid) by splitting off from diethylgallocyanin the carboxylic group *e. g.* by heating the base until a test portion is soluble in hydrochloric acid of 20° Bé. with a pure blue color and is insoluble in sodium carbonate solution. These tests readily distinguish the new dye from diethylgallocyanin which is soluble in sodium carbonate solution and dissolves in hydrochloric acid of 20° Bé. with a red color.

The following example will further illustrate my invention, the parts being by weight:—100 parts of gallocyanin (obtained from nitrosodiethylanilin and gallic acid) in the shape of its salt with hydrochloric acid are heated for several hours with an aqueous solution of 20 parts of NaOH. The reaction is complete when a test portion is insoluble in a sodium carbonate solution and dissolves in hydrochloric acid of 20° Bé. with a blue color. The base is filtered off and converted into its hydrochlorid.

The hydrochlorid of the new dyestuff is after drying a dark green powder soluble in water with a violet color. The new dye is distinguished from diethylgallocyanin from which it is produced, by giving in printing purer shades. It yields upon reduction the leuco compound described in my other application for Letters Patent of same date from which it can be produced by oxidation.

I claim:—

The herein-described new dyestuff obtainable from diethylgallocyanin, which dyestuff in the shape of its hydrochlorid after drying a dark green powder soluble in water with a violet color, being distinguished from diethylgallocyanin by giving in printing purer shades; being soluble in hydrochloric acid of 20° Bé. with a pure blue color, and being insoluble in sodium carbonate solution, substantially as described.

In testimony whereof I have hereunto set my hand in the presence of two subscribing witnesses.

WILHELM LOMMEL. [L. S.]

Witnesses:
  OTTO KÖNIG,
  WILLY KLEIN.